United States Patent [19]
Dubois et al.

[11] Patent Number: 5,428,215
[45] Date of Patent: Jun. 27, 1995

[54] DIGITAL HIGH ANGULAR RESOLUTION LASER IRRADIATION DETECTOR (HARLID)

[75] Inventors: Jacques Dubois, Neufchatel; André Cantin, Loretteville; Maurice Gravel, Ste-Foy, all of Canada

[73] Assignee: Her Majesty the Queen in right of Canada, as represented by Minister of National Defence of Her Majesty's Canadian Government, Ottawa, Canada

[21] Appl. No.: 250,778

[22] Filed: May 27, 1994

[51] Int. Cl.⁶ .............................................. G01J 1/20
[52] U.S. Cl. .............................. 250/206.2; 356/141.5; 250/237 G
[58] Field of Search .................. 250/561, 203.3, 203.6, 250/206.1, 206.2, 208.1, 208.2, 237 G, 203.4; 356/141.2, 141.5, 141.1, 141.3, 141.4, 139.01, 139.02, 139.03, 139.04, 152.1, 152.2, 152.3

[56] References Cited

U.S. PATENT DOCUMENTS

| | | | |
|---|---|---|---|
| 2,855,539 | 10/1958 | Hoover, Jr. | 250/206.2 |
| 3,553,466 | 1/1971 | Jonston | 250/237 G |
| 3,858,201 | 12/1974 | Foster | 356/141.5 |
| 4,806,747 | 2/1989 | Dunavan et al. | 250/206.1 |
| 4,857,721 | 8/1989 | Dunavan et al. | 250/206.1 |
| 4,874,937 | 10/1989 | Okamoto | 356/141.5 |
| 5,173,602 | 12/1992 | Lin | 250/237 G |
| 5,276,496 | 1/1994 | Heller et al. | 250/203.3 |
| 5,355,222 | 10/1994 | Heller et al. | 250/561 |

Primary Examiner—David C. Nelms
Assistant Examiner—John R. Lee
Attorney, Agent, or Firm—Larson and Taylor

[57] ABSTRACT

An apparatus for detecting a beam of radiation, such as a collimated laser beam, and determining the angle-of-arrival of that beam with a high angular resolution, the apparatus comprising a linear array of radiation detectors arranged in a plane and a digital Gray code shadow mask, located at a predetermined height above and parallel to the plane. The Gray code shadow mask is provided with parallel rows containing slot(s) with each of those rows being centrally positioned directly above one of the radiation detectors and arranged so that the rows are perpendicular to the linear array. The slot(s) in each row are located at predetermined distances from the center of a row with those distances differing for each row. A well collimated radiation beam, such as from a laser, directed towards the shadow mask will project images of the slots onto the plane with the positions of the images being dependent on both the positions of the slots and the angle-of-arrival of the beam. This will result, according to the digital Gray code, in some of the images being located on some of the radiation detectors, each of which will then generate an output signal, while some of the radiation detectors will be located in between the images of the slots and not generate any signal. Since the location of the images of the slots is dependent on the angle-of-arrival of the beam, that angle-of-arrival can then be determined from the outputs of all the radiation detectors.

20 Claims, 5 Drawing Sheets

DIGITAL HIGH ANGULAR RESOLUTION LASER IRRADIATION DETECTOR (HARLID)

FIELD OF THE INVENTION

The present invention relates generally to Laser Warning Receivers (LWR) for protecting military platforms against laser guided weapons by detecting, identifying and locating laser sources associated with those weapons and in particular to receivers which can detect radiation emitted by those laser sources to precisely locate any laser threats with a high angular resolution.

BACKGROUND TO THE INVENTION

Many research laboratories and manufacturers around the world are presently involved in the development of Laser Warning Receivers (LWR) for the purpose of protecting military platforms against laser guided weapons by detecting, identifying and locating laser sources associated with those weapons. A high angular resolution in the determination of the angle-of-arrival of the laser radiation from lasers associated with those weapons is essential in order to accurately locate those sources and optimize counter measures which can be effectively deployed against those weapons. The angle-of-arrival of laser beams can be determined by various techniques which can be classified into three different groups, i.e. imaging techniques, masking techniques and time-delay techniques. The present invention pertains to the group which uses masking techniques.

Basically, the masking technique consists of mounting a shadow mask containing one or several slots above an array of detectors. The angle-of-arrival of the radiation is determined from the position where the slot(s) is(are) imaged onto the detectors. For one dimension, a simple approach is to image a single slot on an array of narrow detectors aligned parallel to the slit, so that each detector covers a different sector of the scene. The main problem with this technique is that the number of detectors required, as well as the number of electronic channels, increases proportionally to the angular resolution wanted, thus leading to high costs in order to obtain a sufficiently high angular resolution. Using this type of technique, for example, 9 channels would be required to provide a resolution of 10 degrees within a field-of-view of 90 degrees.

U.S. Pat. No. 4,857,721 (David S. Dunavan et al) which issued on 15 August, 1989 describes, in a first embodiment, an apparatus for determining the direction of arrival of optical radiation wherein an elongated slit aperture is mounted perpendicular to elongated parallel detector strips arranged in an array extending parallel to the slit. An additional mask is located above the array and contains a number of opaque masked areas and a number of transparent areas directly above the detector strips which provide a Gray code pattern with different, complimentary, areas of alternate detector strips being opaque masked. The number of transparent areas above a detector strip increase from one end of the array to the other. A very narrow bar of radiation passing through the slit aperture will lie in a transverse direction across the encoded additional mask and, as a result, be detected by particular ones of the detector strips depending on if that narrow bar of radiation falls on an opaque or transparent area of the mask. The angle at which the radiation passes through the slit aperture will determine the position at which the bar of radiation falls on the encoded mask and it will fall on different transparent areas or opaque areas as the angle is altered. Therefore, the angle-of-arrival of the radiation can be determined from which detector strips detect the narrow bar of radiation. The processing electronics consists of a differential amplifier having its (−) input connected to one detector strip and its (+) input connected to an adjacent, complimentary, detector strip with the differential amplifier output being connected, by a coupling capacitor, to a comparator which provides a binary zero or a binary one code output. With 8 detector strips, this will provide 4 digital code output channels. It is possible, with this arrangement, to achieve a resolution of 6 degrees within a field-of-view of 90 degrees from those 4 channels when 5 transparent areas of the encoded mask lie above the last detector strip and one transparent area is located above the first detector strip and covers half the length of that first strip as illustrated in U.S. Pat. No. 4,857,721.

One disadvantage of the first embodiment described in U.S. Pat. No. 4,857,721 is the use of both an elongated slit aperture in a top mask and an additional mask having a Gray code pattern over the elongated detector strips. U.S. Pat. No. 4,857,721 also described other embodiments in which the additional mask is not required but in which each elongated detector strip is replaced by a number of detector elements (doped regions on a silicon wafer) with each element covering an area that corresponds with a transparent area of the additional mask in the first embodiment. These other embodiments have the disadvantage in that a large number of detector elements are required, each of which must be provided with electrical connections to the processing electronics.

SUMMARY OF THE PRESENT INVENTION

It is an object of the present invention to provide a detector for determining the angle-of-arrival of optical radiation with a high angular resolution wherein a single shadow mask is located above a linear array of photodetector elements.

A radiation beam detector wherein the angle-of-arrival of said beam can be determined with a high degree of angular resolution, according to one embodiment of the present invention, comprises a linear array of radiation detectors arranged in a first plane with a digital shadow mask being located at a predetermined height above and parallel to said plane, the digital shadow mask having a plurality of parallel rows with at least one, radiation transparent, elongated slot being located in each row and extending along that row, each row being centrally located above one of the radiation detectors and arranged substantially perpendicular to said linear array; the slots in each row being positioned at predetermined distances from the center of the row, those predetermined distances differing for each row such that any radiation beam directed onto said shadow mask in the same general direction as a plane extending along the lengths of the slots will project images of said slots onto said first plane and place those images at particular positions in said first plane, the positions of the images being dependent on both the positions of the slots in the shadow mask and on the angle-of-arrival of said beam wherein an image located on any one particular radiation detector generates an output signal from that detector above a predetermined signal threshold level with radiation detectors located in between any images of the slots generating an output signal lower than said predetermined signal threshold level, the angle-of-arrival of said beam being determined from said output signals.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
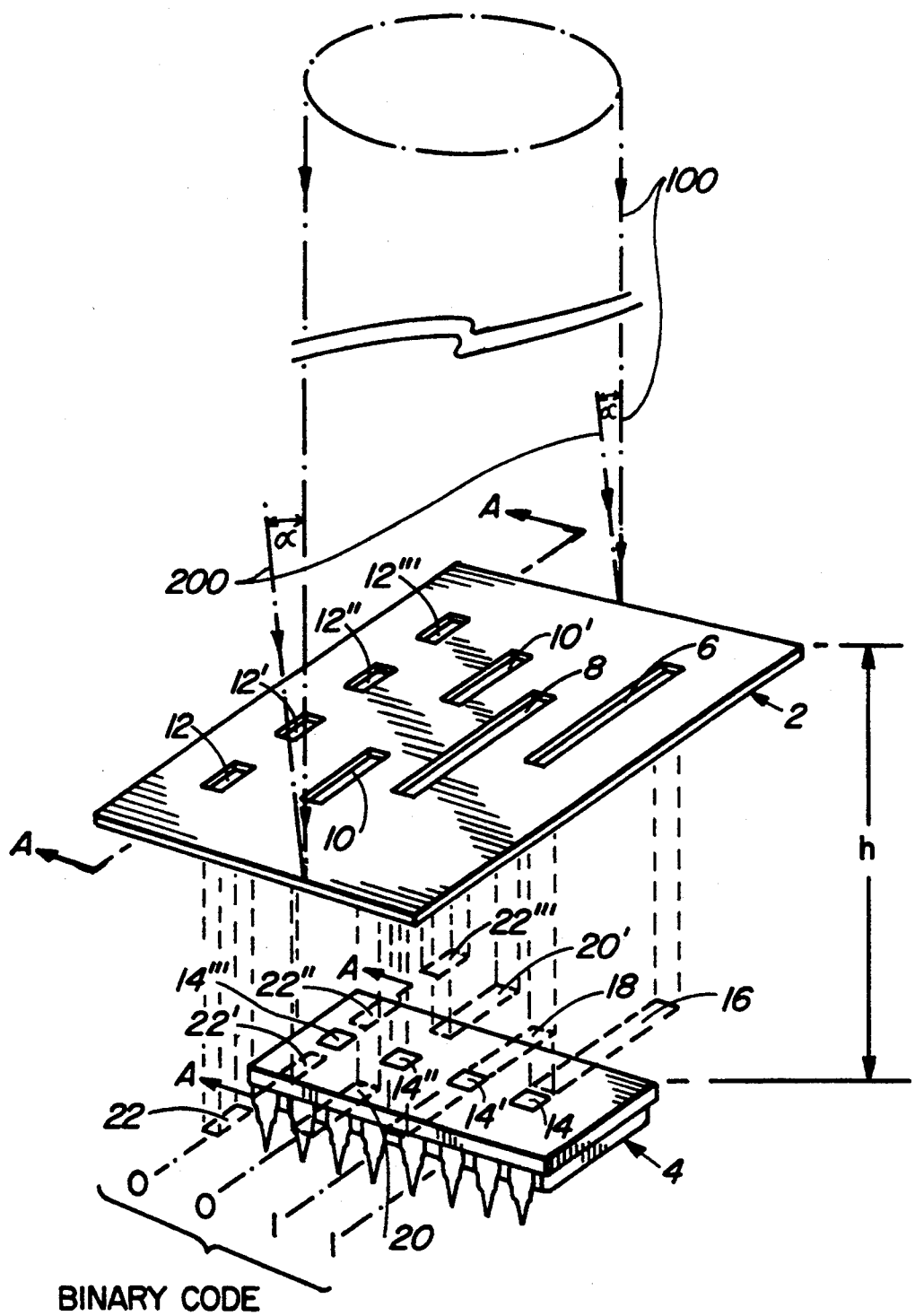
FIG. 1 illustrates the principle of operation of a high angular resolution laser radiation detector according to the present invention.

The present invention is directed to Laser Warning Receivers (LWR) with detectors which provide a means to precisely located laser threats using a digital High Angular Resolution Laser Irradiation Detector (HARLID). The principle of operation of the digital HARLID concept, according to the present invention, is illustrated in FIG. 1. The device shown in FIG. 1 provides for digital angular coding to accurately locate a laser beam source with a single mask.

The means to precisely locate laser threats shown in FIG. 1 consists of one linear array of radiation detectors 14, 14', 14" and 14"' on a detector support 4 over which is installed a shadow mask 2 at a height "h" above the radiation detectors. The radiation detectors may be formed of silicon or other types of semiconductor material which are photosensitive and the linear array extends directly beneath and parallel to a center line of mask 2. The detector support contains circuitry to transpose an output, above a predetermined threshold level, from any one detector to a digital "1" output signal on an output pin associated with that detector with digital "0" output signals being generated on output pins associated with detectors which remain inactivated, i.e. ones which do not detect any radiation from a laser beam. This circuitry can be in the form of an integrated circuit (IC). An optical filter may be positioned over the mask 2 so that only radiation of particular wavelengths, i.e. from particular laser sources, will pass through openings in the shadow mask.

The shadow mask 2 in FIG. 1 is made of a thin metal plate through which has been cut a series of small parallel windows or slots of various lengths. Those slots are arranged in parallel rows which are centrally located directly above the individual photodetectors. The various lengths of the slots are arranged in a pattern corresponding to a digital code. The mask 2 preferably bears a digital Gray code, since a Gray code has the property that only one binary digit of that code changes its value at a time for any incremental change in the angle-of-arrival of a laser beam unlike other binary codes. The shadow mask 2 installed over the linear array of detectors in this HARLID is an image of a Gray code wherein the slots represent a digital "1" of that Gray code. The least significant bit of this Gray code, for example, is represented on the mask by a series of the shortest slots. The slots representing bit 2 of the Gray code will be twice as long as those representing the bit 1 ones and the slot representing bit 3 will be twice as long as the ones for bit 2, etc. . . . , up to the longest slot which represents the most significant bit for the Gray code. The angular resolution will, moreover, increase with the number of bits for a given field of view.

A first single slot 6 of shadow mask 2, in accordance with the Gray code, extends from about the middle of mask 2 towards one edge of mask 2 with the inner end of slot 6 being located above the first photodetector 14. A beam of laser radiation arriving perpendicular to mask 2 will pass through slot 6, forming an image 16, and irradiate photodetector 14 to generate an output therefrom, i.e. a digital "1" from an associated output pin of support 4.

A second single elongated slot 8 is arranged parallel to slot 6 in mask 2 and has its center located directly above the second photodetector 14' in the linear array. This second slot 8 is arranged so that a laser beam perpendicular to mask 2 will pass through slot 8 to create an image 18 that will irradiate photodetector 14'. Therefore, this arrangement will provide a high output, i.e. digital "1", for both photodetectors 14 and 14' from the output pins of support 4 associated with those photodetectors when the shadow mask 2 is illuminated by a collimated laser beam 100 which is perpendicular to mask 2.

The next row of slots consists of two slots, 10 and 10', which are parallel to slots 6 and 8. This row of slots is located above a third photodetector 14" but are spaced on either side of it. A collimated laser beam 100 perpendicular to mask 2 will, therefore, provide narrow images 20 and 20' of slots 10 and 10', respectively, in the plane of the photodetectors. However, those images will lie on either side of photodetector 14" and no output will be generated which results in a digital "0" indication from the output pin of support 4 associated with photodetector 14". The next and last row of slots, four (12, 12', 12" and 12"') being shown in FIG. 1, are located above photodetector 14"' and these slots are spaced equal distances from each other with the two inner slots 12' and 12" being located on either side of photodetector 14"'. Images 22, 22', 22" and 22"' will again be created of slots 12, 12', 12" and 12"', respectively, in the plane of the photodetectors when the shadow mask 2 is irradiated by a laser beam whose angle-of-arrival is perpendicular to shadow mask 2. In this case, as before with slots 10 and 10', the images 22', 22" will lie on either side of photodetector 14"' with no output from 14"' being generated which results in a digital "0" indication for that photodetector from an associated output pin of support 4.

Figure 2:
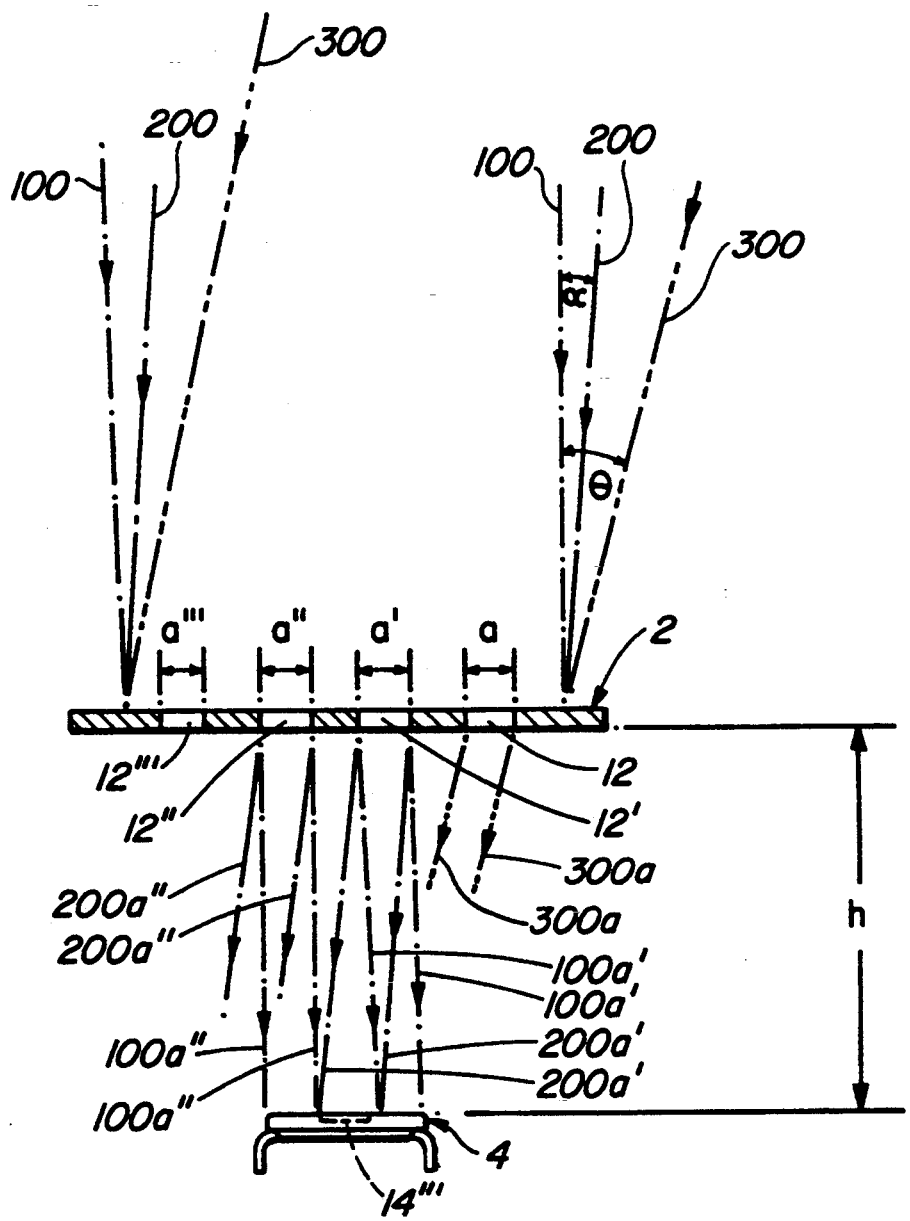
FIG. 2 is a cross-sectional view along lines A—A of FIG. 1.

The effects of changing the angle-of-arrival of a collimated laser beam which irradiates the shadow mask 2 is illustrated in the cross-sectional view in FIG. 2 which is taken along lines A—A in FIG. 1. The laser beam 100 arriving at right angles to mask 2 is illustrated by dash-dot lines in FIG. 2 whereas the laser beam 200 which arrives at a slight angle $\alpha$ to the perpendicular beam 100 is illustrated by longer dash-dot lines. A further laser beam 300 which has an angle-of-arrival $\theta$ that is larger than the one between beams 100 and 200 is shown with a dash-double dot-dash line. The projections of those laser beams 100, 200 and 300 through the slots 12, 12', 12" and 12''' are shown with similar type lines wherein beams 100a" and 100a' are projected through slots 12" and 12', respectively, perpendicular to shadow mask 2. As illustrated in FIG. 2, the beams 100a" and 100a' do not fall on or irradiate photodetector 14''' and, therefore, no output signal will be generated. However, when laser beam arrives at a slight angle α to the perpendicular to the shadow mask, as illustrated by beam 200, then the projections 200a' and 200a" of beam 200 through slots 12' and 12" will also be at an angle α to the perpendicular. This will result in the image 22 of slot 12 in FIG. 1 being changed to the left in FIG. 2 so that it is located above photodetector 14''', that image being formed by the projections 200a' from beam 200 as illustrated. Since image 22' would, as a result, now irradiate detector 14''' due to the imaging of slot 12' via beam 200a', detector 14''' would generate an output signal resulting in a digital "1" from the output pin of support 4 that is associated with detector 14'''.

In a similar manner, an irradiating beam 200 arriving at an angle α to the perpendicular to the shadow mask 2 would also create images of slots 10 and 10, i.e. images 20' and 20 which are located slightly to the right of those images as shown in FIG. 1. However, the angle α is not large enough to transpose the image 20 far enough to the right to irradiate photodetector 14". Therefore, no output will be generated by photodetector 14" in this case which will result in a digital "0" remaining on the output pin of support 4 that is associated with photodetector 14". The image of slot 8 created by a beam 200 will also be located slightly to the right of image 18 shown in FIG. 1 which was created by beam 100. Slot 8 is, however, centered above photodetector 14' with the slot 8 and its image 18 being of a width that photodetector 14' will still be irradiated by beam 200. Therefore, there would be no change in the signal generated by 14' and the output pin of support 4 associated with 14' would still provide a digital "1" output. This is in contrast to the image 16 of slot 6 since, when that slot is irradiated with beam 100, the edge of image 16 is directly above detector 14 to generate an output signal, i.e. a digital "1", from the output pin of support 4 associated with detector 14. When slot 6 is irradiated with a beam 200 at an angle α, the image 16 of that slot will be displaced to the right of the one shown in FIG. 1 and will no longer irradiate photodetector 14. This will, therefore, cause the digital "1" signal for the output pin associated with photodetector 14 to change to a digital "0" signal.

When the angle-of-arrival of a beam from a laser source is shifted so that it arrives at a larger angle θ to the perpendicular beam 100, the images 16, 18, 20, 20', 22, 22', 22" and 22''' of the slots 6, 8, 10, 10', 12, 12', 12" and 12''' will be even farther displaced in the plane of the detectors than the images formed by beam 200 as previously described. In this case, depending on the size of the angle θ, the image 22' of slot 12' will be displaced far enough to the right that it will no longer be above photodetector 14''' and its output signal will go to zero resulting in the digital "1" output from 14''' associated pin, generated by beam 200, being changed to a digital "0". If the angle-of-arrival of the laser beam is even farther shifted from the perpendicular, then the image 22 of slot 12 might be displaced from enough to the right that it would irradiate 14''', generating a signal, and again provide a digital "1" output from the pin associated with 14'''. The beam 300 arriving at an angle θ will cause image 20 of slot 10 to be displaced enough to the right that 14" will be irradiated and generate an output signal. This will cause the output signal from the pin associated with photodetector 14" to provide a digital "1" signal. The width of image 18 and slot 8 is sufficient that changing the angle-of-arrival of a laser beam to θ will still leave the image 18 above photodetector 14'. Therefore, there would be no change in the signal from the output pin associated with detector 14', that output signal remaining a digital "1". Displacing the image 16 of slot 6 even farther to the right would only move the edge of image 16 even farther from photodetector 14 resulting in no change of signal from its associated pin, i.e. it would still be a digital "0".

The angle-of-arrival detector for a laser beam shown in FIG. 1 can generate a 4-bit Gray code which provides a 4-channel capacity. The laser beam projected through slots of the shadow mask, onto the linear array of detector, will form images of the slots that are positioned as a function of the angle-of arrival of the laser radiation, the positions of the images being displaced with different angles-of-arrival so that a different combination of detectors will be energized for the various angular positions of the laser beam. The degree of resolution for the angle-of-arrival of the laser beam will depend on the number of rows of slots in the shadow mask, the number of slots in the rows and the number of detectors. FIG. 1 shows slots arranged in 4 rows to generate a 4-bit Gray code. The pattern of slots in FIG. 1 corresponds to a Gray code wherein only a single binary bit of the code will change for each incremental change in the angle-of-arrival of the beam. This type of arrangement simplifies the calculations necessary to determine the angle-of-arrival from the digital output code, i.e. it reduces the amount of computation needed, reduces uncertainties at boundaries of the slots and increases the speed for determining the angle-of-arrival. However, the number of rows of slots could be increased to provide a higher degree of resolution. The slots in each additional row would be half as long as those in the preceding row. This is illustrated in the shadow mask 2' shown in FIGS. 4 and 5 wherein transparent areas (or slots) 36, 38, 40, 40' and 42 to 42''' correspond with slots 6, 8, 10, 10' and 12 to 12''' in FIG. 1, respectively. The shadow mask 2 has an additional row of transparent areas $52_a$, $52_b$ ... $52_h$ located above radiation detectors in the detector arrays. This will, as a result, provide an additional channel, i.e. a 5-channel or bit capacity. That additional row has 8 transparent areas which result in this module having a much higher resolution in determining the angle-of-arrival of a radiation beam than the modules previously described.

Figure 3:
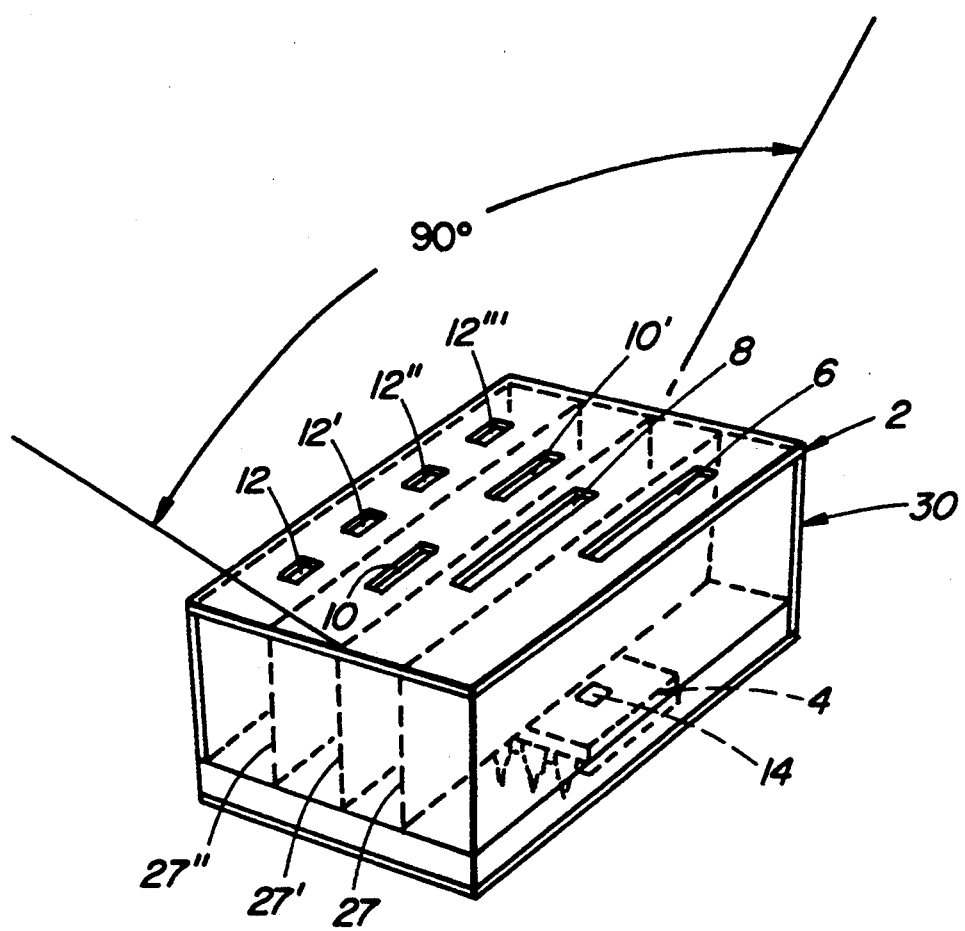
FIG. 3 illustrates one embodiment of a high angular resolution laser radiation detector according to the present invention.

FIG. 3 illustrates an embodiment of the digital HARLID apparatus in which a series of light baffles are used to define one optical channel per bit of the digital code which will prevent undesirable optical crosstalks between the bits, i.e. between the channels, which might occur at high levels of irradiation. In FIG. 3, the detector support 4, its photodetectors, shadow mask 2 and slots 6 to 12''' are identical to those shown in FIG. 1 but are surrounded by an enclosure 30 between the shadow mask 2 and detector support 4. A series of light baffles 27, 27' and 27" are positioned between each row of slots and its associated photodetector. Each light baffle is spaced centrally between rows of slots and extends from the shadow mask to the bottom of the enclosure or at least to the plane in which the photodetectors are arranged. The enclosure will, of course, be opaque so that extraneous radiation will be excluded from reaching any of the photodetectors. The surface of the baffles 27, 27' and 27" are made highly reflective in order to guide the incident radiation projected through a slot onto only its associated photodetector. The incident radiation projected through any one slot in this arrangement will only be directed to one photodetector and will, therefore, increase the field-of-view in the axis not providing angular resolution. Similar results could be achieved by using light guides based on glass plates separated by a reflective coating instead of light baffles.

Figure 4:
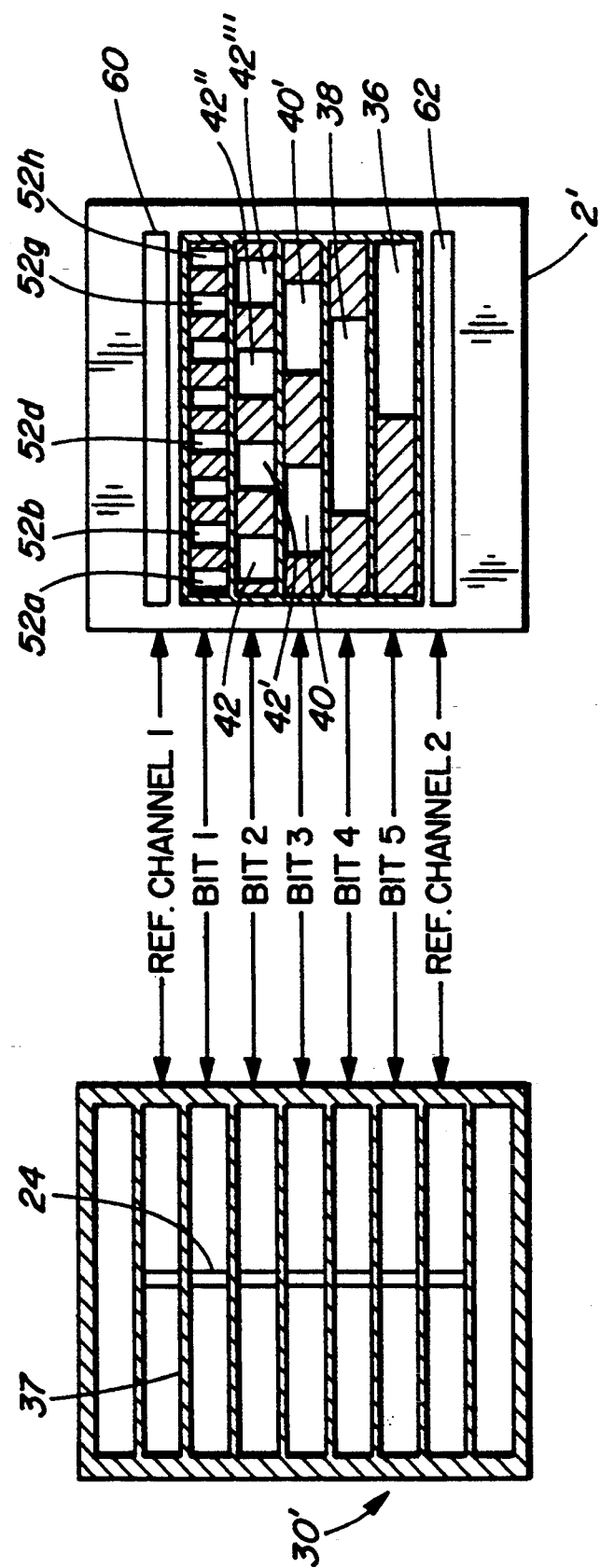
FIG. 4 illustrates a high angular resolution laser radiation detector according to still a further embodiment of the present invention in which reference channels have been provided for the radiation detectors.

In order to determine the status of a bit, i.e. either a digital "1" or "0" on a pin for an output channel, the output of the corresponding detector for that channel is compared to a fixed threshold level and a digital "1" is generated for that channel when the output from that detector is above that fixed threshold. However, the use of a fixed threshold is not particularly satisfactory for general field conditions where a lot of background (radiation) noise may be present and atmospheric conditions can result in scintillation causing output signals to fluctuate dramatically. A further embodiment of the invention is illustrated in FIG. 4 which avoids problems associated with the use of a single fixed threshold level to which outputs from the detectors are compared. In this further embodiment, one or more reference channels are added which are always exposed to any incoming laser radiation.

FIG. 4 illustrates an embodiment in which two reference channels have been added to the detector, a first Reference Channel 1 being created by a transparent area 60 at one end of shadow mask 2' and a second Reference Channel 2 being created by a transparent area 62 at the other end of the mask. Those transparent areas 60 and 62, at opposite ends of the mask, extend the full widths of the rows and are located above detectors at each end of the linear array 24 of detectors. The linear array of detectors 24 are located in an opaque enclosure 30' containing a number of light baffles 37, one for each channel, which are located between individual detectors of array 24. The detectors associated with these reference channels do not add more bits, or channels, to the output code but do allow a threshold level to be set which is dependent on the strength of the laser beam directed to the detectors and which is still above the background noise. The outputs from other detectors of the linear array are then compared with that set, but adjustable for different conditions, threshold in order to determine on which output pins a digital "1" or "0" signal should be generated.

The dynamic threshold which can be obtained by using reference channels operates much better in field conditions than a fixed threshold since it adapts itself to the background conditions and received signal levels. One or more of these reference channels can be added to the detector and they can be placed anywhere amongst the bit channels. The output of a "bit" channel is normally compared with the output of the nearest reference channel, usually on a pulse-by-pulse basis when a pulsed laser source is the one being detected.

Figure 5:
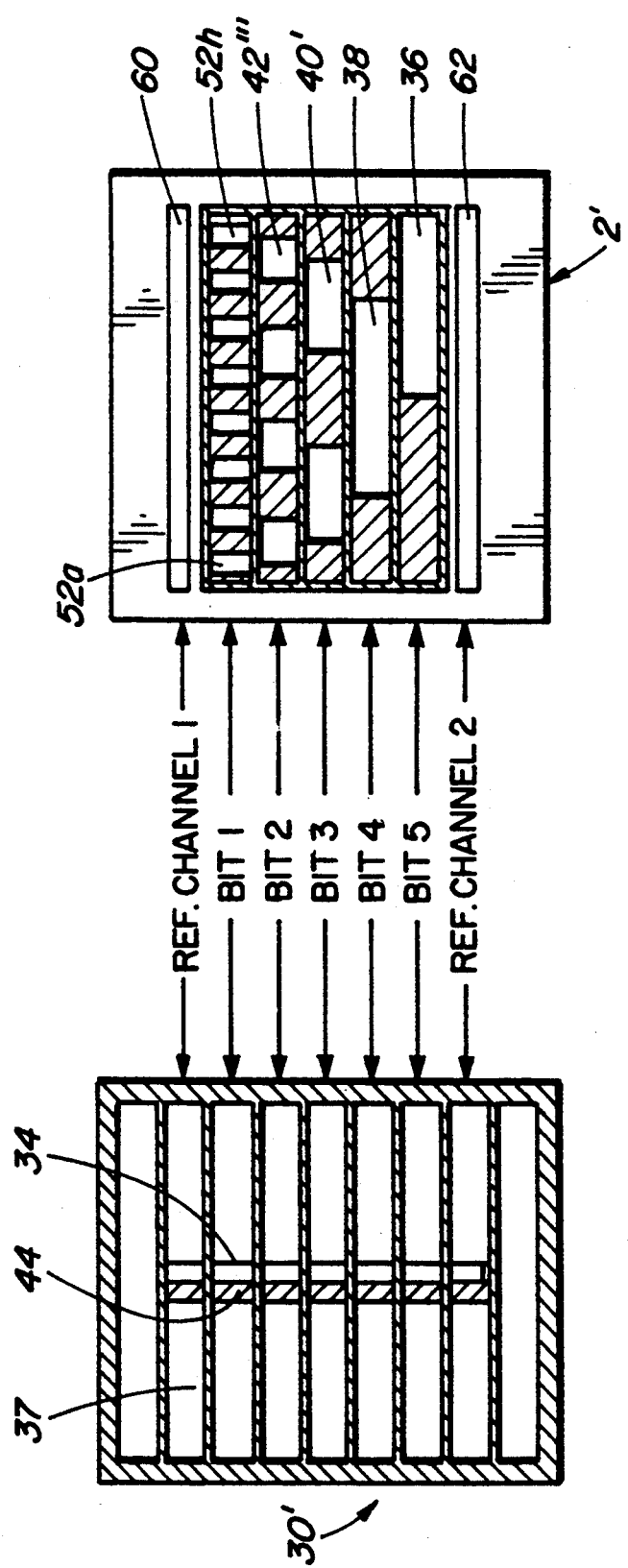
FIG. 5 illustrates a high angular resolution laser radiation detector according to a further embodiment of the present invention which has two rows of detectors with an attenuation filter over one row.

A still further embodiment of the invention is illustrated in FIG. 5 wherein two or more parallel linear arrays of detectors, i.e. 34 and 44, would be used instead of the single one described in the previous embodiments. This allows the use of an optical attenuation filter over the supplementary detector array 44, or over further supplementary detector arrays, in order to increase the dynamic range of the HARLID module. The angle-of-arrival detector shown in FIG. 5 consists of an opaque enclosure 30' above two centrally located parallel linear detector arrays 34 and 44 with light baffles 37 extending across and perpendicular to the detector array. A Gray code shadow mask 2' is located on top of enclosure 30' and has parallel rows of transparent areas or slots located directly above the areas between the baffles 37 which is similar to the module described with respect to FIG. 4. The first row of detectors 34 is similar to the row or array 24 in FIG. 4. However, an attenuation filter is installed (or deposited) onto the second row. This filter will usually attenuate the incoming radiation by a factor of one thousand or more which dramatically increases the dynamic range of a HARLID module. With this configuration, two sets of "bits" output (high and low sensitivities) will be generated and fed to separate amplifiers. When a high level of radiation is directed onto this HARLID module, the non-attenuated channels may be caused to saturate and become inoperable whereas the attenuated ones will continue to produce outputs that can be read by the processing electronics. There is also a slight position offset (relative to the mask 2') between the two rows of detectors. This can be used to obtain more angular resolution since, due to the offset, they will not read exactly the same angle-of-arrival, i.e. effectively increasing the number of detectors for the same number of slots in the shadow mask.

The coding of the modules illustrated in FIGS. 1 to 5 will operate on only one axis at a time and, therefore, another similar module will be required on the other axis in order to allow for measurements in two dimensions.

Various modifications may be made to the described embodiments without departing from the spirit and scope of the invention as defined in the appended claims. The miniaturization of this High Angular Resolution Laser Irradiation Detector (HARLID) according to the present invention is possible. Such a miniaturization, for instance to a volume <1 cm$^3$, coupled to the use of multiple reference channels would substantially reduce the susceptibility of these HARLID modules to inhomogeneities of the laser beam which might result, for example, from a propagation of the laser beam through a turbulent atmosphere. In addition, although the FIGS. 1 to 3 show a number of slots cut in a thin metal plate to form a shadow mask, an alternative type of shadow mask could be formed by plating opaque areas onto a transparent plate which is provided with an anti-reflective coating.

The embodiments of the invention in which an exclusive property or privilege is claimed are defined as follows:

1. A detector for a collimated beam of radiation wherein the angle-of-arrival of said beam can be determined with a high degree of angular resolution comprising, a first linear array of radiation detectors arranged in a first plane with a digital shadow mask being located at a predetermined height above and parallel to said plane, the shadow mask being provided with a plurality of parallel rows which are each centrally located above one of the radiation detectors and which are arranged substantially perpendicular to said first linear array, at least one elongated, radiation transparent, slot being located in each row of the shadow mask with all slots extending in the same direction as the associated row and positioned at predetermined distances from the center of that row, those predetermined distances differing for each row and arranged so that any radiation beam directed towards the shadow mask in the same general direction as a plane extending along the lengths of the slots, will project images of said slots onto the first plane in which the radiation detectors are arranged with those images being located at positions in said first plane which are dependent on both the positions of the slots in the shadow mask and on the angle-of-arrival of the radiation beam wherein any of the images which are located on a radiation detector will cause that detector to generate an output signal above a predetermined signal threshold level, the detector including a first means for determining on which of the radiation detectors an image of a slot is located from the generated output signals, a second means for determining which radiation detectors are located in between images of the slots and means for determining the angle-of-arrival of a radiation beam from said first means and said second means.

2. A radiation beam detector wherein the angle-of-arrival of said beam can be determined with a high degree of angular resolution comprising, a first linear array of radiation detectors arranged in a first plane with a digital shadow mask being located at a predetermined height above and parallel to said plane, the shadow mask having a plurality of parallel rows with at least one, radiation transparent, elongated slot being located in each row and extending along that row, each row being centrally located above one of the radiation detectors and arranged substantially perpendicular to said linear array; the slots in each row being positioned at predetermined distances from the center of the row, those predetermined distances differing for each row such that any radiation beam directed onto said shadow mask in the same general direction as a plane extending along the lengths of the slots, will project images of said slots onto said first plane and place those images at particular positions in said first plane, the positions of the images being dependent on both the positions of the slots in the shadow mask and on the angle-of-arrival of said beam wherein an image located on any one particular radiation detector generates an output signal from that detector above a predetermined signal threshold level with radiation detectors located in between any images of the slots generating an output signal lower than said predetermined signal threshold level, the radiation detectors being located on a detector support having circuitry and output pins with one output pin being associated with each radiation detector in the first linear array, wherein an image of a slot located on any one particular radiation detector generates an output signal from that detector which is applied to the circuitry that then generates a digital "1" output signal from the output pin associated with that particular radiation detector, a digital "0" signal being generated by the circuitry on all output pins which are associated with radiation detectors located in between any images of the slots, the angle-of-arrival of said beam being determined from signals on the output pins.

3. A radiation beam detector as defined in claim 2, wherein an opaque enclosure surrounds the space between the shadow mask and the first linear array and light baffles are located in the enclosure between each row, the light baffles extending between the shadow mask to said first plane such that radiation projected through any particular slot is only directed onto an area of the first plane containing the radiation detector associated with that particular slot.

4. A radiation beam detector as defined in claim 3, wherein the light baffles have highly reflective surfaces.

5. A radiation beam detector as defined in claim 2, wherein a light guide is located between a row of the shadow mask and the radiation detector associated with that particular row.

6. A radiation beam detector as defined in claim 2, wherein the shadow mask's slots are arranged in accordance with a digital Gray code with one row of the shadow mask containing a single slot which extends from the center of the shadow mask towards one edge of the shadow mask, the inner end of that single slot being located directly above one radiation detector of the first linear array, another row of the shadow mask containing a second single slot having a center located directly above another radiation detector of the first linear array, each remaining row being directly above a single radiation detector of the first linear array and having a plurality of slots arranged at predetermined distances from the center of the associated row, each remaining row having a different number of slots with the slots in any one remaining row having substantially equal lengths and being spaced apart by equal distances wherein positions of the slots and spaces between the slots are symmetrically arranged with respect to the center of the associated row and with each additional row having slots that are half the length of slots in the preceding row.

7. A radiation beam detector as defined in claim 2, wherein at least one additional reference radiation detector is associated with the first linear array, the shadow mask having an additional, radiation transparent, slot located above that additional reference radiation detector and extending parallel to said rows for the full length of those rows, an output from said reference radiation detector setting said predetermined threshold signal level for adjacent radiation detectors.

8. A radiation beam detector as defined in claim 3, wherein at least one additional reference radiation detector is associated with the first linear array, the shadow mask having an additional, radiation transparent, slot located above that additional reference radiation detector and extending parallel to said rows for the full length of those rows, an output from said reference radiation detector setting said predetermined threshold signal level for adjacent radiation detectors.

9. A radiation beam detector as defined in claim 5, wherein at least one additional reference radiation detector is associated with the first linear array, the shadow mask having an additional, radiation transparent, slot located above that additional reference radiation detector and extending parallel to said rows for the full length of those rows, an output from said reference radiation detector setting said predetermined threshold signal level for adjacent radiation detectors.

10. A radiation beam detector as defined in claim 6, wherein at least one additional reference radiation detector is associated with the first linear array, the shadow mask having an additional, radiation transparent, slot located above that additional reference radiation detector and extending parallel to said rows for the full length of those rows, an output from said reference radiation detector setting said predetermined threshold signal level for adjacent radiation detectors.

11. A radiation beam detector as defined in claim 7, wherein at least one additional linear array of radiation detectors is arranged adjacent and parallel to said first linear array of radiation detector with an optical attenuation filter being arranged over at least one of the linear arrays.

12. A radiation beam detector as defined in claim 8, wherein at least one additional linear array of radiation detectors is arranged adjacent and parallel to said first linear array of radiation detector with an optical attenuation filter being arranged over at least one of the linear arrays.

13. A radiation beam detector as defined in claim 9, wherein at least one additional linear array of radiation detectors is arranged adjacent and parallel to said first linear array of radiation detector with an optical attenuation filter being arranged over at least one of the linear arrays.

14. A radiation beam detector as defined in claim 10, wherein at least one additional linear array of radiation detectors is arranged adjacent and parallel to said first linear array of radiation detector with an optical attenuation filter being arranged over at least one of the linear arrays.

15. A radiation beam detector as defined in claim 1, wherein the shadow mask's slots are arranged in accordance with a digital Gray code with one row of the shadow mask containing a single slot which extends from the center of the shadow mask towards one edge of the shadow mask, the inner end of that single slot being located directly above one radiation detector of the first linear array, another row of the shadow mask containing a second single slot having a center located directly above another radiation detector of the first linear array, each remaining row being directly above a single radiation detector of the first linear array and having a plurality of slots arranged at predetermined distances from the center of the associated row, each remaining row having a different number of slots with the slots in any one remaining row having substantially equal lengths and being spaced apart by equal distances wherein positions of the slots and spaces between the slots are symmetrically arranged with respect to the center of the associated row and with each additional row having slots that are half the length of slots in the preceding row.

16. A radiation beam detector as defined in claim 15, wherein at least one additional reference radiation detector is associated with the first linear array, the shadow mask having an additional, radiation transparent, slot located above that additional reference radiation detector and extending parallel to said rows for the full length of those rows, an output from said reference radiation detector setting said predetermined signal threshold level for adjacent radiation detectors.

17. A radiation beam detector as defined in claim 16, wherein at least one additional linear array of radiation detectors is arranged adjacent and parallel to said first linear array of radiation detector with an optical attenuation filter being arranged over at least one of the linear arrays.

18. A radiation beam detector as defined in claim 15, wherein an opaque enclosure surrounds the space between the shadow mask and the first linear array and light baffles are located in the enclosure between each row, the light baffles extending between the shadow mask to said first plane such that radiation projected through any particular slot is only directed onto an area of the first plane containing the radiation detector associated with that particular slot.

19. A radiation beam detector as defined in claim 17, wherein an opaque enclosure surrounds the space between the shadow mask and the first linear array and light baffles are located in the enclosure between each row, the light baffles extending between the shadow mask to said first plane such that radiation projected through any particular slot is only directed onto an area of the first plane containing the radiation detector associated with that particular slot.

20. A radiation beam detector as defined in claim 17, wherein a light guide is located between a row of the shadow mask and the radiation detector associated with that particular row.

* * * * *